United States Patent
Kronrod et al.

(10) Patent No.: US 10,146,931 B1
(45) Date of Patent: Dec. 4, 2018

(54) ORGANIZATION-LEVEL PASSWORD MANAGEMENT EMPLOYING USER-DEVICE PASSWORD VAULT

(71) Applicant: EMC Corporation, Hopkinton, MA (US)

(72) Inventors: Boris Kronrod, Lexington, MA (US); Lawrence N. Friedman, Arlington, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 62 days.

(21) Appl. No.: 14/657,286

(22) Filed: Mar. 13, 2015

(51) Int. Cl.
*G06F 21/45* (2013.01)
*G06F 21/46* (2013.01)
*H04L 29/06* (2006.01)

(52) U.S. Cl.
CPC .............. *G06F 21/45* (2013.01); *G06F 21/46* (2013.01); *H04L 63/083* (2013.01)

(58) Field of Classification Search
CPC ......... G06F 21/45; G06F 21/46; H04L 63/083
See application file for complete search history.

(56) References Cited

U.S. PATENT DOCUMENTS

| | | | |
|---|---|---|---|
| 5,944,824 A * | 8/1999 | He | G06F 21/33 726/6 |
| 6,704,873 B1 * | 3/2004 | Underwood | H04L 63/02 709/223 |
| 8,127,345 B2 * | 2/2012 | Gregg | G06F 21/335 726/4 |
| 8,707,409 B2 * | 4/2014 | Shah | G06F 21/41 726/8 |
| 8,819,768 B1 | 8/2014 | Koeten et al. | |
| 9,081,973 B2 * | 7/2015 | Newman | G06F 21/604 |
| 9,544,314 B2 * | 1/2017 | Gregg | G06F 21/335 |
| 2005/0114673 A1 * | 5/2005 | Raikar | G06F 21/46 713/182 |
| 2005/0153682 A1 * | 7/2005 | Minear | H04L 12/2854 455/405 |
| 2006/0080419 A1 * | 4/2006 | Patrick | H04L 41/082 709/220 |
| 2006/0080545 A1 * | 4/2006 | Bagley | H04L 63/083 713/183 |

(Continued)

*Primary Examiner* — Luu T Pham
*Assistant Examiner* — James J Wilcox
(74) *Attorney, Agent, or Firm* — BainwoodHuang

(57) ABSTRACT

A computer system includes a management computer for automatically changing a password used to authenticate a user to a service application. A user device includes a password vault managed by a password management application. The management computer monitors for an event signifying that the password is to be changed, e.g., a predetermined number of uses, etc. A new password is assigned, and a first message is generated and sent to the service application including the new password and an indication that it is to be used for subsequent user authentication. A second message is also generated and sent to the password management application, also including the new password and an indication that it replaces a current password in the vault for user authentication. The new password is automatically used by both the service application and the user device during subsequent authentications until expiration.

18 Claims, 3 Drawing Sheets

(56) References Cited

U.S. PATENT DOCUMENTS

| | | | |
|---|---|---|---|
| 2008/0077809 A1* | 3/2008 | Hayler | G06F 12/1466 |
| | | | 713/193 |
| 2008/0104411 A1* | 5/2008 | Agrawal | H04L 9/3226 |
| | | | 713/183 |
| 2011/0047606 A1 | 2/2011 | Blomquist et al. | |
| 2011/0154459 A1* | 6/2011 | Kuang | H04L 63/08 |
| | | | 726/6 |
| 2013/0014236 A1* | 1/2013 | Bingell | G06F 21/45 |
| | | | 726/6 |
| 2014/0298432 A1 | 10/2014 | Brown | |
| 2015/0135305 A1* | 5/2015 | Cabrera | G06F 21/62 |
| | | | 726/17 |
| 2015/0222604 A1* | 8/2015 | Ylonen | H04L 63/062 |
| | | | 713/171 |
| 2015/0244706 A1* | 8/2015 | Grajek | H04W 12/06 |
| | | | 726/6 |
| 2015/0286816 A1* | 10/2015 | Adler | H04L 63/083 |
| | | | 726/6 |
| 2015/0310188 A1* | 10/2015 | Ford | G06F 21/10 |
| | | | 726/28 |
| 2015/0341357 A1* | 11/2015 | Rambur | H04L 63/10 |
| | | | 726/3 |
| 2016/0070903 A1* | 3/2016 | Abuelsaad | G06F 21/45 |
| | | | 726/6 |
| 2017/0041296 A1* | 2/2017 | Ford | H04L 63/0421 |
| 2017/0142076 A1* | 5/2017 | Ford | G06F 21/10 |
| 2017/0163689 A1* | 6/2017 | Ylonen | H04L 63/062 |
| 2017/0185787 A1* | 6/2017 | Momchilov | H04L 63/0815 |
| 2017/0201550 A1* | 7/2017 | Benson | H04L 63/0815 |
| 2017/0222995 A1* | 8/2017 | Ylonen | H04L 63/062 |
| 2017/0366580 A1* | 12/2017 | Ylonen | H04L 63/062 |
| 2018/0075231 A1* | 3/2018 | Subramanian | G06F 21/41 |

\* cited by examiner

ORGANIZATION-LEVEL PASSWORD MANAGEMENT EMPLOYING USER-DEVICE PASSWORD VAULT

BACKGROUND

Organizations or enterprises are including legacy computer systems that use traditional password-based user authentication, i.e., authentication based on username/password pair. Some systems or applications may employ Active Directory authentication pairs, while others may require their own credentials. In larger organizations there may be several such legacy applications that a user may use, every one requiring a respective password.

One approach to password management in such circumstances is for each user to manage his own passwords for both in-enterprise and third-party applications. Because of the difficulty of remembering a number of complex or arbitrary passwords, there is tendency for the passwords to be weak. They might be easily guessed. Even stronger passwords are not safe, as they can be phished or extracted by malware that has infected a computer system. If the passwords are not changed often enough, then there is opportunity for a system to be accessed improperly using a stolen or guessed password.

There are known systems that can provide stronger user authentication with less risk of password compromise or damage resulting from any compromise. One system employs so-called "one-time passwords" or OTPs. Users are given hardware or software "tokens" that execute a secure algorithm for generating random passwords, and these are synchronized to counterpart server-executed algorithms. Whenever a user authenticates to a system or application, the token is used to generate a new OTP, which is compared with an OTP generated within the system. A match indicates user possession of the assigned token, leading to authentication of the user. Another type of system employs so-called "federation", in which a collection of servers are integrated with a centralized authentication server that handles user authentication and issues briefly lived passcodes or tickets that are accepted by the servers as evidence of user authentication. Both types of system require some type of integration of the specialized authentication methods/facilities into the service computer or application, and thus are not universally utilized. Even in an enterprise that uses such a system, there may be legacy systems or applications that are not integrated into the system and thus pose a security vulnerability due to their reliance on user-managed passwords.

SUMMARY

The present disclosure is directed to methods and apparatus for improved security in systems and applications that employ conventional password-based authentication, especially such systems or applications that have conventionally relied upon users managing their own passwords. Disclosed techniques provide for use of stronger passwords and more frequent changing of passwords, without requiring integration of an application with a specialized system such as an OTP system or federation, and without burdening the user to remember a large number of complex and short-lived passwords.

The disclosed methods and apparatus employ a password vault which may be of the type generally known in the art, e.g., password managers such as LastPass or Roboform that are installed on user devices. In contrast to the conventional use of such password managers, i.e., with the user controlling the timing of new password generation etc., in the present application an enterprise management computer such as an identity management system works through the password manager to implement an organization password policy. The management computer pushes new passwords both to a target service application, which may be a legacy application for example, and to the password vault on user device(s). This can be done as a background process not visible to the user. When a user is to authenticate to the service application, the new password is retrieved from the vault. New passwords may be pushed at a desired high frequency, either based on a time interval or a number of uses, which in one example might be a single use (i.e., each password is used only once).

More particularly, a method is disclosed of operating a management computer to automatically change a password used by a user to authenticate to a service application executing in a service computer system communicatively coupled to the management computer. The user has a computerized user device including a vault in which active passwords are stored, the vault being managed by a password management application executing either on the user device or on a password management server coupled to the user device.

The method includes monitoring for occurrence of an event signifying that the password is to be changed. As mentioned, the event might be passage of time, a number of uses, etc. In response to occurrence of the event, a new password is first assigned. Then a first message is generated and sent to the service computer system, the first message including the new password and an indication that the service application is to begin using the new password to authenticate the user to the service application. Concurrently, a second message is generated and sent to the password management application, the second message including the new password and an indication that the new password is to replace a current password in the vault for use in authenticating the user to the service application.

With the above process complete, the next time the user accesses the service application, the new password is automatically used for the authentication. The device-based password vault typically can auto-populate a login or other authentication page, saving the user from having to manually copy the new password into a password field. Thus, lengthy and complex passwords can be employed with no burden on the user.

The event signifying that the password is to be changed coincides with expiration of a current password, which as mentioned may be based on any of a variety of policies. To assist the management computer in monitoring for expiration, the user device or service application may inform the management computer when a new password has been used for authentication. In the case of a one-time-use regime, for example, that notification would trigger generation and sending of a next new password.

One advantage of the disclosed technique is the ability to create and maintain short-lived or "ephemeral" passwords, which are much less risky than the more static passwords used today for legacy applications that do not support federation, OTP authentication, or other schemes requiring application integration. An organization or enterprise can enforce password policy both for internal and external applications, and have less exposure to password phishing or other password stealing attacks. The disclosed approach is generally better than user-driven password management, because it supports strong passwords and frequent changing of passwords. Even if a user employs a conventional vault solution, there is still the problem of relatively infrequent changing of passwords. So the disclosed technique is better by virtue of the automated generation and use of new passwords at a desired high frequency, even to the logical extreme of one-time use.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Figure 1:
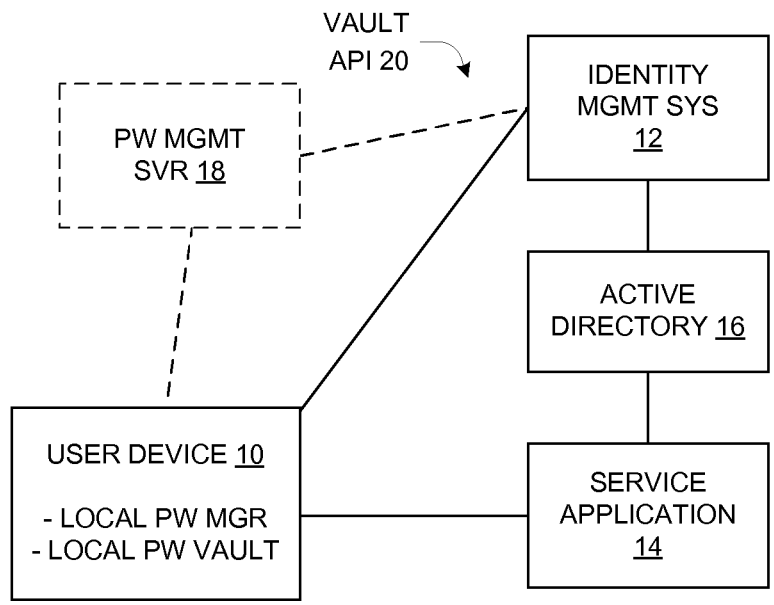
FIG. 1 is a block diagram of a computer system.

FIG. 1 shows a computing system having computerized devices including a user device 10 and a collection of server computers collectively implementing an identity management server 12, a service application 14, an active directory 16, and optionally a password management server 18. In one embodiment, the user device 10 is a mobile device such as a smartphone or tablet computer, although the disclosed techniques are not limited to such use. The user device 10 executes a local password manager (PW MGR) that includes a secure password repository referred to as a password "vault" (PW VAULT). Applications of this general type are known in the art, e.g., LastPass, IPassword, RoboForm, etc. The components 12-18 are part of an enterprise computing system or other single administrative domain at least for password-management purposes. The components 12-18 are generally realized as software applications being executed on computer hardware, i.e., on one or more server-type computers as generally known in the art.

Specifically as described above, the service application 14 may be a legacy application employing its own password-based user authentication rather than participating in a more integrated "federation" scheme, e.g., Kerberos or other token-based authentication regime, that may be used in an enterprise. Such federations provide the desired robustness with respect to passwords (i.e., tokens) used throughout the system. The service application 14 may be deployed in a system completely lacking any such integrated authentication scheme, or it may be part of a system that includes such a scheme but the service application 14 does not participate, for technical or business reasons for example.

As shown, the identity management system 12 communicates with either the user device 10 or password management server 18 via a vault application programming interface (API) 20. The vault API 20 enables external management of the contents of the PW vault and of the operation of the PW manager on the user device 10. In an embodiment including the password management server 18, the vault API 20 is provided by the Password management server 18, which communicates separately with the user device 10. Alternatively, the user device 10 may provide the vault API 20 for use by the identity management system 12 in directly communicating with the user device 10.

While FIG. 1 shows direct connections, it is to be understood that some or all of the connections among the components may be carried by one or more respective networks. In one common configuration, the server components 12-18 may be interconnected by one or more local-area networks or LANs, i.e., enterprise LANs, and the user device 10 connects to the servers via a wider-area network such as the Internet or corporate VPN. It should also be noted that the disclosed techniques may be realized in other kinds of system configurations. For example, the identity management system 12 may be replaced by some other type of server operating as described herein. The active directory 16 may be absent or realized in some different manner, e.g., as part of some other server. Some or all servers may be deployed in a cloud.

Figure 2:
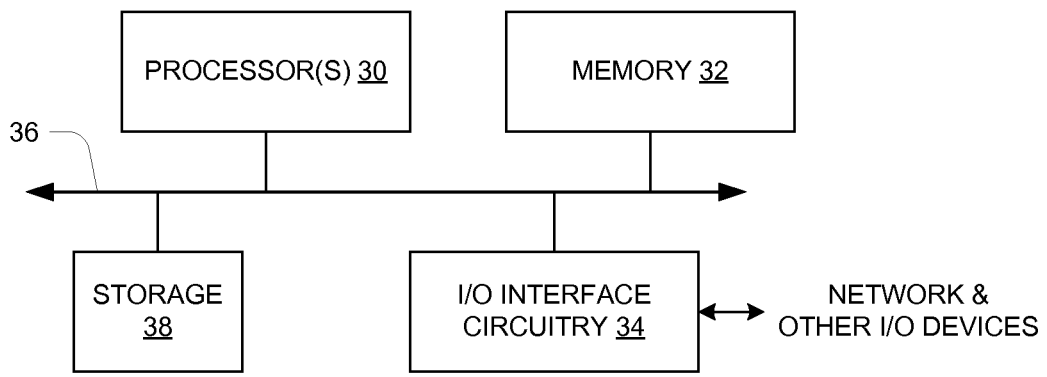
FIG. 2 is a block diagram of a computer from a hardware perspective.

FIG. 2 shows an example configuration of a physical computer, as may be used to realize the user device 10 or any of the servers 12-18 for example, from a computer hardware perspective. The hardware includes one or more processors 30, memory 32, and interface circuitry 34 interconnected by data interconnections 36 such as one or more high-speed data buses. The interface circuitry 34 provides a hardware connection to external devices/connections (EXT DEVs), e.g., network connections to other system components. The processor(s) 30 with connected memory 32 may also be referred to as "processing circuitry" herein. There may also be local storage 38 such as a local-attached disk drive or Flash drive. In operation, the memory 32 stores data and instructions of system software (e.g., operating system) and one or more application programs which are executed by the processor(s) 30 to cause the hardware to function in a software-defined manner. Thus the computer hardware executing instructions of a password management application, for example, can be referred to as a password management circuit or password management component, and it will be understood that a collection of such circuits or components can all be realized and interact with each other as one or more sets of computer processing hardware executing different computer programs as generally known in the art. Further, the application software may be stored on a non-transitory computer-readable medium such as an optical or magnetic disk, Flash memory or other non-volatile semiconductor memory, etc., from which it is retrieved for execution by the processing circuitry, as also generally known in the art.

Figure 3:
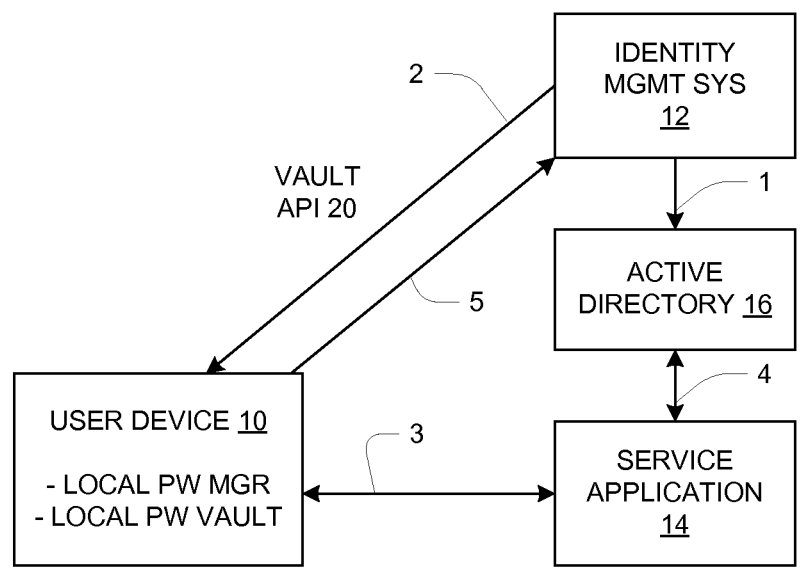
FIG. 3 is a block diagram of a computer system with references to a sequence of operations of a process performed therein.

FIG. 3 is used to describe overall operation, with numbers indicating respective operations occurring between components. In each case an operation will include transfer of one or more corresponding messages on the respective connection, which will be application-level messages carried on an underlying transport such as TCP/IP etc. as generally known in the art.

The process begins within the identity management system 12, which is responsible for higher-level control in accordance with an established password management policy. An example is used which assumes a policy of one-time use for passwords. Other policies may of course be employed, including for example time-based expiration of passwords or event-based expiration with identification of the triggering events. Policies may also incorporate different bases, e.g., both time-based and event-based. Additionally of course, the process may be initiated by a security event, such as discovery that a password may have been compromised.

Thus it is assumed that at some time the identify management system 12 is to assign a new password for authenticating the user (using the user device 10) to the service application 14. The identity management system 12 may auto-generate the new password or perhaps obtain it in some other manner. It then initiates the following process, numbered to correspond to the depiction in FIG. 3:

1. The identity management system 12 provides the new password to the active directory 16 to be used by the service application 14 in new authentications of the user.

2. The identity management system 12 provides the new password to the user device 10 using the vault API 20. That is, the new password is stored in the password vault on the user device 10 in association with an identification of the service application 14, for use in authenticating the user thereto.

3. The user at some later time accesses the service application 14 and uses the new password from the vault in the login or other authentication process. As known in the art, the password manager on the user device may auto-populate the password field of a login page with a password it retrieves from the vault, saving the need for the user to interrogate the vault and then manually enter the password.

4. As part of the user authentication process, the service application passes the password that was supplied by the user in step 3 to the directory 16, which compares the supplied password with the password that is stored in the directory 16. Access is then granted or denied based on the result of the authentication, in the usual manner.

5. The user device 10 notifies the identity management system 12 that the new password has been used. Assuming a policy of one-time use, the identity management system then repeats steps 1 and 2 for a next new password that will be required for the next user login. These operations may be done immediately or scheduled in some manner.

In one variation, the notification (step 5) of use of the new password may be sent by the service application 14 or directory service, i.e., active directory 16, rather than by the user device 10. In an embodiment employing a time-based password policy, the notification at step 5 may be unnecessary and thus dispensed with. In an embodiment employing the Password management server 18, step 2 may include sub-steps for the identity management system 12 invoking the Password management server 18 and then the Password management server 18 communicating with the user device 10.

Figure 4:
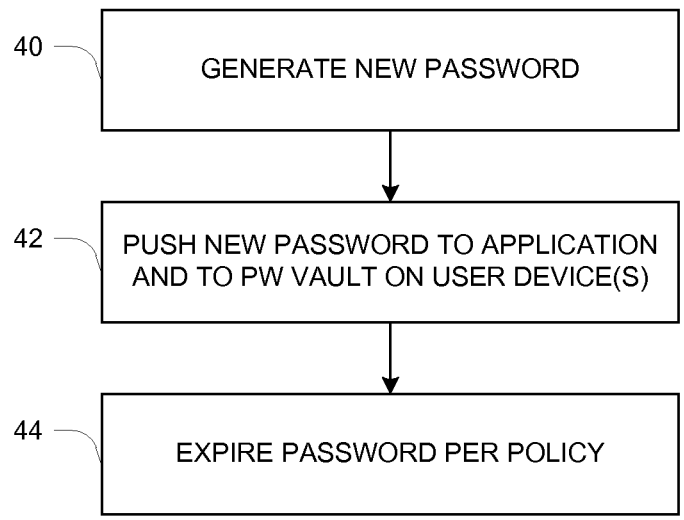
FIG. 4 is a flow diagram of operation of a management computer.

FIG. 4 describes pertinent operation of the identity management system 12 in the above process. At 40, it generates (or otherwise obtains) a new password that is to be used for new authentications by a given user to a given service application. This may occur when a current password has expired. The password is preferably a strong password, limited perhaps by the maximum password size that can be used with the service application. A strong password is long (i.e., 10-20 characters or more) and has a random mix of letters (of mixed case), numbers, and non-alphanumeric characters (punctuation symbols, etc.). These kinds of strong passwords can be used because the user is not required to remember them—they are stored in the password vault and generally auto-populated into a login field by the password manager operating on the user device 10. The password-generating logic of the identity management system 12 may implement a policy regarding password strength, i.e., a policy specifying things like minimum length, requirement for upper case and/or non-alpha characters, arbitrariness, etc.

At 42, the identity management system 12 provides or "pushes" the new password to both the service application (or its active directory, as described above) and to the vault on the user device 10, which may be done via a separate password management server 18. This operation includes sending one or more messages to both the service application 14 and the user device 10 (either directly or via the password management server 18), with contents including the new password as well as an identification of the user and the service application 14 for which the new password is being provided.

At 44, the identity management system 12 expires the new password according to a policy that is in place, at which time the process of FIG. 4 is repeated for a next new password. As mentioned, the password expiration policy may be use-based, e.g., one-time use, or it may be time-based and/or event-based. In a one-time-use regime, successive iterations of the operation of FIG. 4 will be in step with successive uses of the service application 14 by the user.

Figure 5:
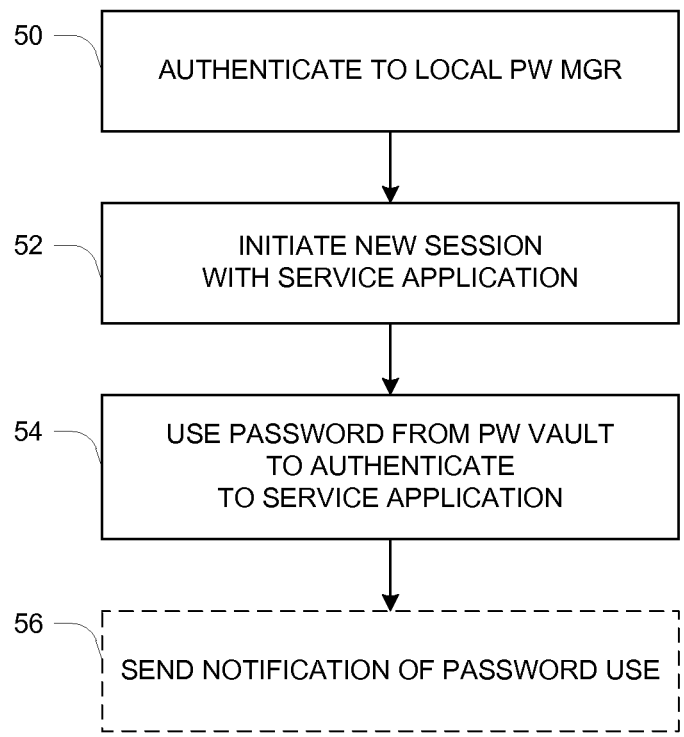
FIG. 5 is a flow diagram of operation of a user device.

FIG. 5 describes pertinent operation of the user device 10 in the above-described process of FIG. 3. At 50, the user performs a local authentication to the local password manager, enabling the password vault to be opened to supply passwords for external applications/services as needed. At 52, the user device 10 initiates a new session with the service application, and at 54 it uses the password stored in the vault for authenticating to the service application. The password will have been provided as part of the overall process as described above. At 56, the user device 10 sends a notification to the identity management system 12 that the current password has been used in an authentication, which as described above is a trigger for generating a new password in a one-time-use regime. Operation 56 is shown in dashed lines indicating that may be omitted in some embodiments, especially those that employ other expiration policies.

Regarding the notification at 56, there may be different conditions applied to whether and how the notification is sent, specifically depending on whether the authentication fails. If the authentication fails, it is an indication that a fraudster may be involved and thus the operation may be modified to reduce security risk. For example, it may be desirable to refrain from sending the normal notification, and in some cases the normal notification may be replaced by a notification of the unsuccessful authentication. This type of notification can enable the identity management system to take other protective action, which might include flagging this user's account as having heightened security risk for example.

While various embodiments of the invention have been particularly shown and described, it will be understood by those skilled in the art that various changes in form and details may be made therein without departing from the spirit and scope of the invention as defined by the appended claims.

What is claimed is:

1. A method of operating a management computer to automatically change a password used by a user to authenticate to a service application executing in a service computer system communicatively coupled to the management computer, the service computer system including a service application server and an active directory server, the user having a computerized user device including a vault in which active passwords are stored, the vault being managed by a password management application executing either on the user device or on a password management server coupled to the user device, the method comprising:

monitoring for occurrence of an event signifying that the password is to be changed, the event being a single use of the password for authenticating the user to the service application, and in response to occurrence of the event:

assigning a new password;

generating a first message and sending it to the service computer system, the first message including the new password and an indication that the service application is to begin using the new password to authenticate the user to the service application, the first message being sent via a first interface of the management computer, the first interface coupling the management computer to a first network and the service computer system, the first message being sent to the active directory server to update a user authentication record used by the active directory server in authenticating the user to the service application; and generating a second message and sending it to the password management application, the second message including the new password and an indication that the new password is to replace a current password in the vault for use in authenticating the user to the service application, the second message being sent via a second interface of the management computer, the second interface coupling the management computer to a second network and the user device used by the user, wherein generating the second message and sending it to the password management application includes communicating with the user device using a vault application programming interface (API) that (i) enables external management of contents of the password vault and of the operation of the password management application, and (ii) causes the new password to be stored in the vault in association with an identification of the service application for use in the authenticating of the user thereto.

2. The method of claim 1, wherein assigning the new password includes auto-generating the new password at the management computer.

3. The method of claim 2, wherein the auto-generating is according to an organization policy.

4. The method of claim 3, wherein the policy specifies the event signifying that the password is to be changed.

5. The method of claim 3, wherein the policy specifies a construction of the password including minimum length and required usage of types of characters.

6. The method of claim 1, wherein the event signifying that the password is to be changed is specified in an explicit organization policy regarding password usage.

7. The method of claim 1, wherein monitoring for the event includes receiving a notification from either the user device or the service application that a current password was used for an authentication.

8. A management computer, comprising:

one or more processors;

memory coupled to the processors by a high-speed data bus; and input/output interface circuitry coupled to the memory and the processors by the high-speed data bus, the input/output interface circuitry coupling the management computer to a service computer system and a computerized user device used by a user, the user device including a vault in which active passwords are stored, the vault being managed by a password management application executing either on the user device or on a password management server coupled to the user device, the memory storing instructions which, when executed by the processors, cause the management computer to operate to automatically change a password used by the user to authenticate to a service application executing in the service computer system, by:

(1) monitoring for occurrence of an event signifying that the password is to be changed, the event being a single use of the password for authenticating the user to the service application, and (2) in response to occurrence of the event:

(a) assigning a new password;

(b) generating a first message and sending it to the service computer system, the first message including the new password and an indication that the service application is to begin using the new password to authenticate the user to the service application; and (c) generating a second message and sending it to the password management application, the second message including the new password and an indication that the new password is to replace a current password in the vault for use in authenticating the user to the service application, wherein the instructions, when executed by the processors to cause the management computer to generate the second message and send it to the password management application, cause the management computer to communicate with either the user device or password management server via a vault application programming interface (API) that (i) enables external management of contents of the password vault and of the operation of the password management application, and (ii) causes the new password to be stored in the vault in association with an identification of the service application for use in authenticating the user thereto, wherein the input/output interface circuitry includes a first interface to a first network for coupling the management computer to the service computer system, and includes a second interface to a second network for coupling the management computer to the computerized user device used by the user, and wherein (i) the first message is sent to the service computer system via the first interface, and (ii) the second message is sent to the password management application via the second interface, and wherein the service computer system includes a service application server and an active directory server, and the first message is sent to the active directory server to update a user authentication record used by the active directory server in the authenticating of the user to the service application.

9. The management computer of claim 8, wherein assigning the new password includes auto-generating the new password at the management computer.

10. The management computer of claim 9, wherein the auto-generating is according to an organization policy.

11. The management computer of claim 10, wherein the policy specifies the event signifying that the password is to be changed.

12. The management computer of claim 10, wherein the policy specifies a construction of the password including minimum length and required usage of types of characters.

13. The management computer of claim 8, wherein the event signifying that the password is to be changed is specified in an explicit organization policy regarding password usage.

14. The management computer of claim 8, wherein monitoring for the event includes receiving a notification from either the user device or the service application that a current password was used for an authentication.

15. The management computer of claim 8, wherein:

the computerized user device is one of a plurality of computerized user devices used by respective users, each user device including a respective vault managed by a respective password management application executing either on the respective user device or on the password management server, and the input/output interface circuitry couples the management computer to the plurality of computerized user devices; and the instructions are executed by the processors to cause the management computer to operate to automatically change respective passwords used by respective users by performing steps (1) and (2) for each password change, including:

at step (2)(a), assigning a respective new password for the respective user;

at step (2)(b), generating a respective first message including the respective new password and including an indication that the service application is to begin using the respective new password to authenticate the respective user to the service application; and at step (2)(c), generating a respective second message and sending it to the respective password management application, the respective second message including the respective new password and an indication that the respective new password is to replace a respective current password in the vault of the respective user device for use in authenticating the respective user to the service application.

16. A computer system, comprising:

a service computer system executing a service application;

a computerized user device including a vault in which active passwords are stored, the passwords including a password used by a user to authenticate to the service application, the vault being managed by a password management application executing either on the user device or on a password management server coupled to the user device; and a management computer used to automatically change the password used by the user to authenticate to the service application, the management computer being configured and operative to monitor for occurrence of an event signifying that the password is to be changed, the event being a single use of the password for authenticating the user to the service application, and in response to occurrence of the event (1) assign a new password, (2) generate a first message and send it to the service computer system, the first message including the new password and an indication that the service application is to begin using the new password to authenticate the user to the service application, and (3) generate a second message and send it to the password management application using a vault application programming interface (API), the second message including the new password and an indication that the new password is to replace a current password in the vault for use in authenticating the user to the service application, the password management application being configured and operative, in response to communications from the management server using the vault API, to (i) enable the management server to manage contents of the password vault and operation of the password management application, and (ii) in response to the second message using the vault API, to store the new password in the vault in association with an identification of the service application for subsequent use by the user device in authenticating the user to the service application, wherein the management computer includes a first interface to a first network for coupling the management computer to the service computer system, and includes a second interface to a second network for coupling the management computer to the computerized user device used by the user, and wherein (i) the first message is sent to the service computer system via the first interface, and (ii) the second message is sent to the password management application via the second interface, and wherein the service computer system includes a service application server and an active directory server, and the first message is sent to the active directory server to update a user authentication record used by the active directory server in the authenticating of the user to the service application.

17. The computer system of claim 16, wherein assigning the new password includes auto-generating the new password at the management computer.

18. The computer system of claim 16, wherein the event signifying that the password is to be changed is specified in an explicit organization policy regarding password usage.

* * * * *